(12) United States Patent
Kida

(10) Patent No.: US 6,577,357 B2
(45) Date of Patent: Jun. 10, 2003

(54) DISPLAY DEVICE AND DEFECT REPAIRING METHOD OF THE SAME WITH LOW STACKED CONDUCTOR REGIONS TO FACILITATE LASER CUTTING

(75) Inventor: Kazutoshi Kida, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 38 days.

(21) Appl. No.: 09/819,473

(22) Filed: Mar. 28, 2001

(65) Prior Publication Data

US 2001/0026332 A1 Oct. 4, 2001

(30) Foreign Application Priority Data

Mar. 29, 2000 (JP) ........................... 2000-091224
Feb. 14, 2001 (JP) ........................... 2001-036631

(51) Int. Cl.$^7$ .......................................... G02F 1/1333
(52) U.S. Cl. ............................................. 349/54
(58) Field of Search ........................... 349/54, 192, 139

(56) References Cited

U.S. PATENT DOCUMENTS 5,212,574 A * 5/1993 Katayama et al. ............. 359/59
6,008,877 A * 12/1999 Akiyama et al. ............ 349/147
2001/0009447 A1 * 7/2001 Ohta et al. ................. 349/43 A

FOREIGN PATENT DOCUMENTS

JP 61288441 A 12/1986

* cited by examiner

*Primary Examiner*—Robert H. Kim
*Assistant Examiner*—Timothy L Rude
(74) *Attorney, Agent, or Firm*—Dike, Bronstein, Roberts & Cushman IP Group Edwards & Angell, LLP; David G. Conlin; David A. Tucker

(57) ABSTRACT

In the display device (10), at least one of a scanning line (2) and a signal line (3) is a multi-layer wiring including first and second conductive layers (3a, 3b), and the multi-layer wiring (3) includes a low-stacked region (3') where the second conductive layer (3b) is not formed.

16 Claims, 6 Drawing Sheets

DISPLAY DEVICE AND DEFECT REPAIRING METHOD OF THE SAME WITH LOW STACKED CONDUCTOR REGIONS TO FACILITATE LASER CUTTING

BACKGROUND OF THE INVENTION

1. Field of the Invention

The present invention generally relates to a display device and a defect repairing method of the same. More particularly, the present invention relates to an active matrix display device and a defect repairing method of the same.

2. Description of the Background Art

Currently, active matrix liquid crystal display devices (LCDs) are widely used. In particular, TFT LCDs using thin film transistors (hereinafter, referred to as TFTs) as switching elements are widely used.

The TFT LCD has picture elements formed from picture-element electrodes arranged in a matrix, counter electrodes facing the picture-element electrodes, and a liquid crystal layer interposed therebetween. The display state of each of the plurality of picture elements is controlled by an electric signal supplied thereto through a corresponding TFT connected to a corresponding scanning line and signal line.

A substrate of the TFT LCD on which the TFTs are formed (hereinafter, referred to as "TFT substrate") is made by repeatedly conducting the steps of depositing a semiconductor film, insulating film and conductor film on an insulating substrate and patterning these films. This necessarily results in production of defective TFTs that do not have normal TFT properties, short-circuit and disconnection of scanning line and signal line, and the like. The LCD fabricated with such a defective TFT substrate has defective picture elements (picture-element defects) that cannot provide prescribed display due to their failure to receive a normal voltage.

In particular, if a scanning line and a signal line of a normally white mode LCD are short-circuited at their intersection, a bright line 22 is produced on a liquid crystal panel 20, which extends crosswise along the scanning line and signal line from the short-circuited intersection 22a, as schematically shown in FIG. 8, thereby significantly degrading the display. Conventionally, such a display defect is repaired with, e.g., laser light. More specifically, the signal line is cut with laser light at positions interposing the short-circuited intersection 22a therebetween.

However, the inventor found that such a method for cutting a wiring with laser light has large variation in cutting accuracy and sometimes cannot completely cut the signal line when applied to, e.g., a signal line 3 of a multi-layer wiring structure having first and second conductive layers 3a and 3b as shown in FIG. 9.

The problems in repairing the defects of the conventional display devices have been described exemplarily for the TFT LCDs. However, these problems are not limited to the TFT LCDS, but are common to display devices having wirings of a multi-layer wiring structure (e.g., organic EL (electroluminescence) display devices).

SUMMARY OF THE INVENTION

The present invention is made to solve the aforementioned problems, and it is an object of the present invention to provide a display device capable of reliably and efficiently repairing defects, and a defect repairing method of the same.

According to the present invention, a display device includes a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including first and second conductive layers, and the multi-layer wiring includes a low-stacked region where the second conductive layer is not formed. Thus, the aforementioned object is achieved.

The at least one of the scanning line and the signal line, which is a multi-layer wiring, may include the low-stacked region on both sides of an intersection with the other line.

The first conductive layer is preferably formed from a material having a smaller specific resistance value than that of the second conductive layer.

A width of an optimal laser power band for cutting the first conductive layer is preferably larger than that of an optimal laser power band for cutting the second conductive layer.

The display device may be a liquid crystal display device in which the plurality of picture elements include a liquid crystal layer.

According to the present invention, a method for repairing a defect in a display device including the aforementioned structure includes the step of cutting the first conductive layer by selectively radiating laser light to the first conductive layer formed in the low-stacked region. Thus, the aforementioned object is achieved.

Hereinafter, functions of the present invention will be described.

The multi-layer wiring having the first and second conductive layers has the low-stacked region where the second conductive layer is not formed. Accordingly, by radiating laser light to the low-stacked region of the multi-layer wiring, the first conductive layer (multi-layer wiring) can be reliably and efficiently cut without being affected by the second conductive layer. For example, the low-stacked region can be formed with a mask of a predetermined pattern that is prepared in the step of forming the second conductive layer. Therefore, no additional step is required to form the low-stacked region.

It should be appreciated that the multi-layer wiring may further have a third conductive layer in addition to the first and second conductive layers. In this case, it is preferable that the multi-layer wiring further has a region where the third conductive layer is not formed, and that this region is a low-stacked region where the second conductive layer is not formed. However, the present invention is not limited to this. As long as the multi-layer wiring has a low-stacked region where at least one conductive layer is not formed, the multi-layer wiring can be cut more reliably and efficiently by radiating laser light to that region than by radiating to another region. The second conductive layer is preferably formed on the first conductive layer. However, the present invention is not limited to this. It is preferable to omit a conductive layer that is less likely to be cut with laser light. It should be appreciated that the multi-layer wiring may have a semiconductor layer and/or an insulating layer in addition to the plurality of conductive layers.

It is preferable that at least one of the scanning line and the signal line, which is a multi-layer wiring, has a low-stacked region formed on both sides of the intersection with the other line. For example, in the case where the signal line is the multi-layer wiring, it is preferable that the signal line has a low-stacked region formed on both sides of the intersection with the scanning line, i.e., at positions interposing the intersection with the scanning line therebetween.

In the case where the first conductive layer is formed from a material having a smaller specific resistance value than that of the second conductive layer, the multi-layer wiring having low electrical resistance is easily realized, whereby a display device having excellent electrical properties is obtained.

When the width of the optimal laser power band for cutting the first conductive layer is larger than that of the optimal laser power band for cutting the second conductive layer, cutting of the low-stacked region is facilitated.

DETAILED DESCRIPTION OF THE PREFERRED EMBODIMENTS

Hereinafter, a TFT LCD and a defect repairing method thereof according to an embodiment of the present invention will be described with reference to the accompanying drawings. The present invention is not limited to the following embodiment.

Figure 1A:
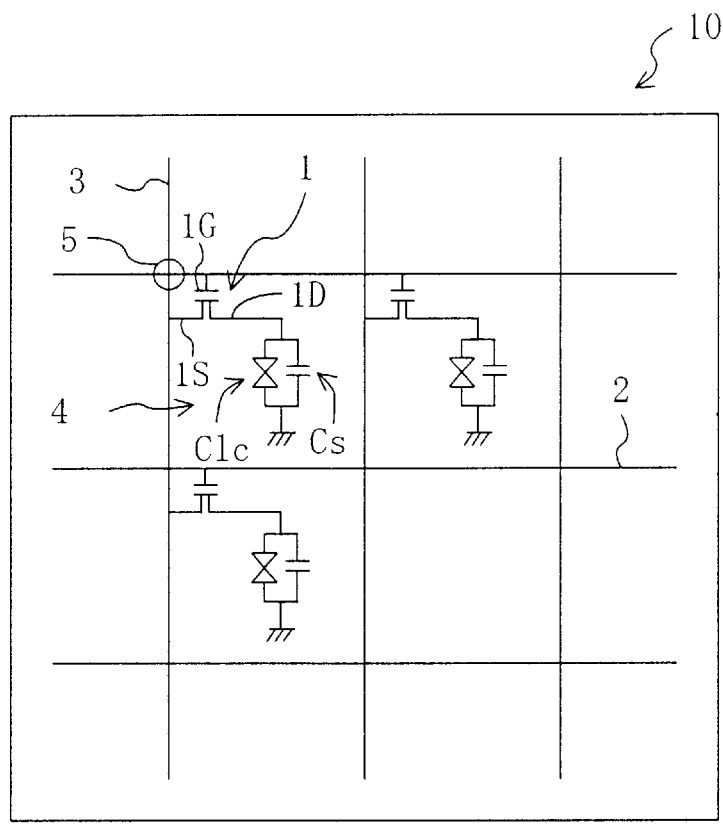
FIG. 1A is a plan view schematically showing a TFT liquid crystal panel 10 according to an embodiment of the present invention.

FIG. 1A schematically shows a TFT liquid crystal panel 10 of the present embodiment. The LCD of the present embodiment has the liquid crystal panel 10, and a driving circuit for supplying a driving signal to the liquid crystal panel. This LCD also has a backlight, if necessary. Since the components other than the liquid crystal panel 10 are known in the art, description thereof is omitted.

As shown in FIG. 1A, the liquid crystal panel 10 has TFTs 1, scanning lines 2 each connected to the gates 1G of the corresponding TFTs 1, signal lines 3 each connected to the source electrodes 1S of the corresponding TFTs 1, and picture-element capacitors 4 each connected to the drain electrode ID of the corresponding TFT 1. The picture-element capacitor 4 has a liquid crystal capacitor Clc formed from a liquid crystal layer provided between a picture-element electrode and a counter electrode (all of which are not shown), and a storage capacitor Cs connected in parallel with the liquid crystal capacitor Clc. The display state of each picture element 4 is controlled by an electric signal that is supplied thereto through the corresponding TFT 1 connected to the corresponding scanning line 2 and corresponding signal line 3. In other words, the alignment state of the liquid crystal layer varies according to the voltage applied to the liquid crystal capacitor Clc, so that luminance of the picture element varies correspondingly. The storage capacitor Cs is provided to hold the voltage applied to the liquid crystal capacitor Clc, and is sometimes omitted.

Figure 1B:
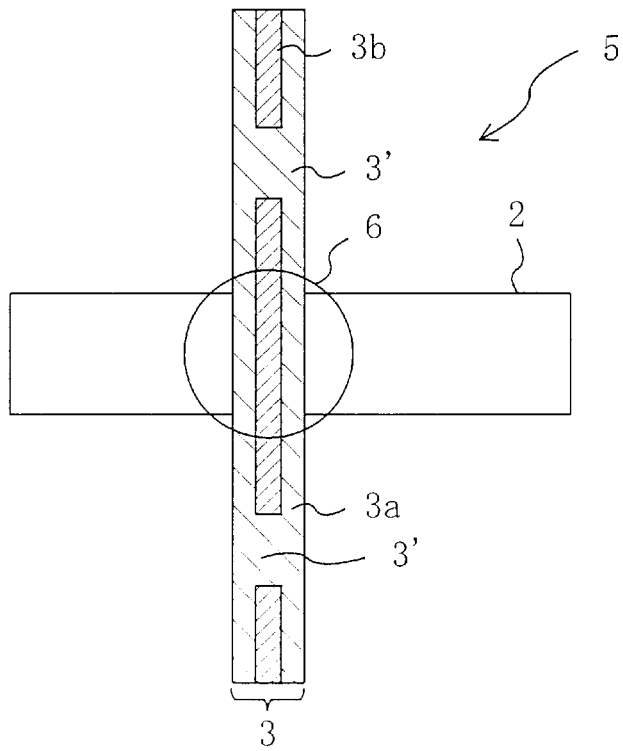
FIG. 1B is a plan view schematically showing the structure of a region 5 around an intersection 6 in the TFT liquid crystal panel 10 (enlarged view of the region 5 in FIG. 1A).

FIG. 1B is an enlarged view of a region 5 around the intersection 6 of the scanning line 2 and the signal line 3 in FIG. 1A. As shown in FIG. 1B, the signal line 3 is a multi-layer wiring having a first conductive layer 3a and a second conductive layer 3b formed thereon. In the signal line 3 of the present invention, the second conductive layer 3b is partially omitted so as to provide low-stacked regions 3'. In other words, the low-stacked region 3' of the signal line 3 is formed only from the first conductive layer 3a. The first conductive layer 3a is formed from, for example, a metal having relatively high conductivity (e.g., Ta). The second conductive layer 3b is formed from, for example, a conductive material whose conductivity is not reduced by oxidation (e.g., ITO (Indium Tin Oxide)).

Figure 2:
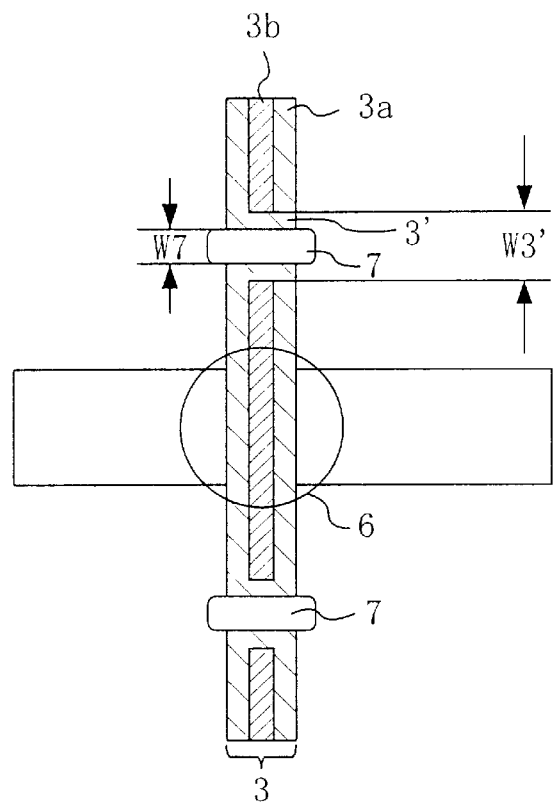
FIG. 2 is a plan view showing the cutting position of a signal line 3 for repairing a display defect caused by a short-circuited intersection 6.
Figure 8:
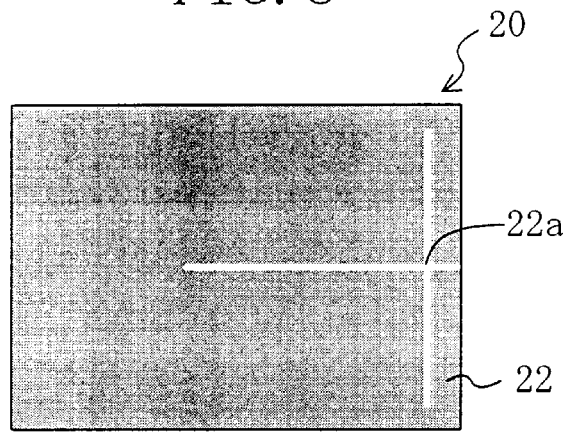
FIG. 8 is a diagram schematically showing a display defect-caused by a short-circuited intersection of a scanning line and a signal line.

It is now assumed that, in this liquid crystal panel 10, the scanning line 2 and signal line 3 are short-circuited at their intersection 6, causing the display defect as shown in FIG. 8. The signal line 3 of the liquid crystal panel 10 of the present invention has the low-stacked regions 3'. Accordingly, the signal line 3 can be reliably and efficiently cut by radiating laser light to the low-stacked regions 3' as shown in FIG. 2 (cut portions 7 are formed). A bright line produced extends on both sides of the short-circuited intersection 6. Therefore, the low-stacked region 3' of the signal line 3 is provided on both sides of the intersection 6 with the scanning line 2. In the case where the bright line extends only on one side of the short-circuited intersection 6, the low-stacked region 3' of the signal line 3 need only be provided on one side of the intersection 6 with the scanning line 2.

Figure 3:
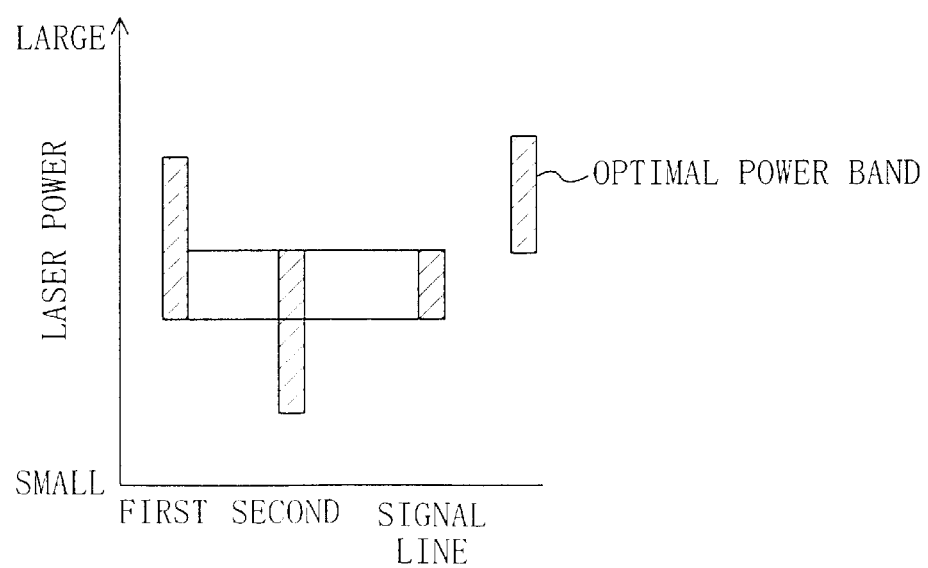
FIG. 3 is a diagram schematically showing a laser power band required to cut a signal line.
Figure 9:
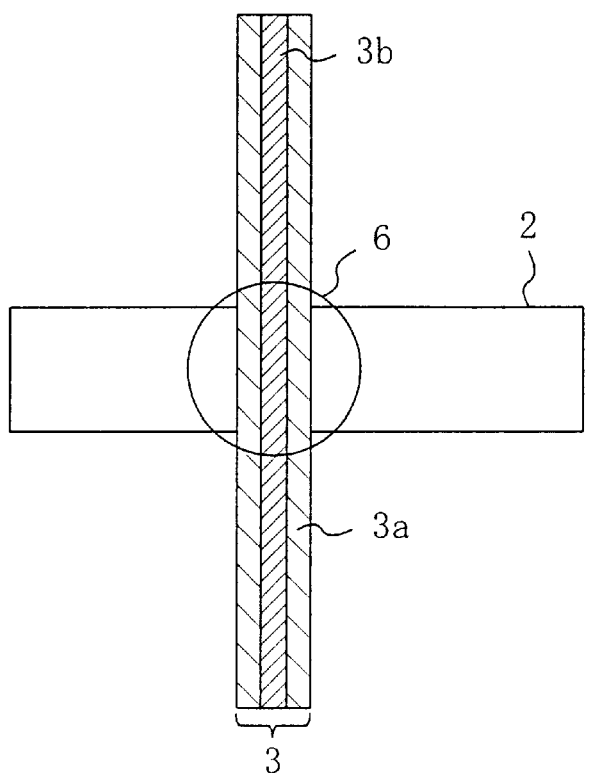
FIG. 9 is a diagram schematically showing a signal line having a two-layer structure in a conventional TFT liquid crystal panel.

In contrast, in the case of the two-layer wiring of the conventional liquid crystal panel 20 as shown in FIG. 9, both the first and second conductive layers 3a and 3b must be cut with laser light in order to cut the signal line 3. However, the first and second conductive layers 3a and 3b are formed from different materials, and therefore have different physical properties such as melting point, heat capacity, and laser light absorptance (reflectance). Therefore, as shown in FIG. 3, respective optimal laser power bands for cutting the first and second conductive layers 3a and 3b are different. Accordingly, the width (margin) of the optimal laser power band for simultaneously cutting the first and second conductive layers 3a and 3b is limited to the overlapping region of the respective optimal laser power bands, so that only a narrow laser power band can be used. This causes problems such as variation in cutting accuracy, and reoccurrence of short-circuit due to insufficient cutting.

Figure 4:
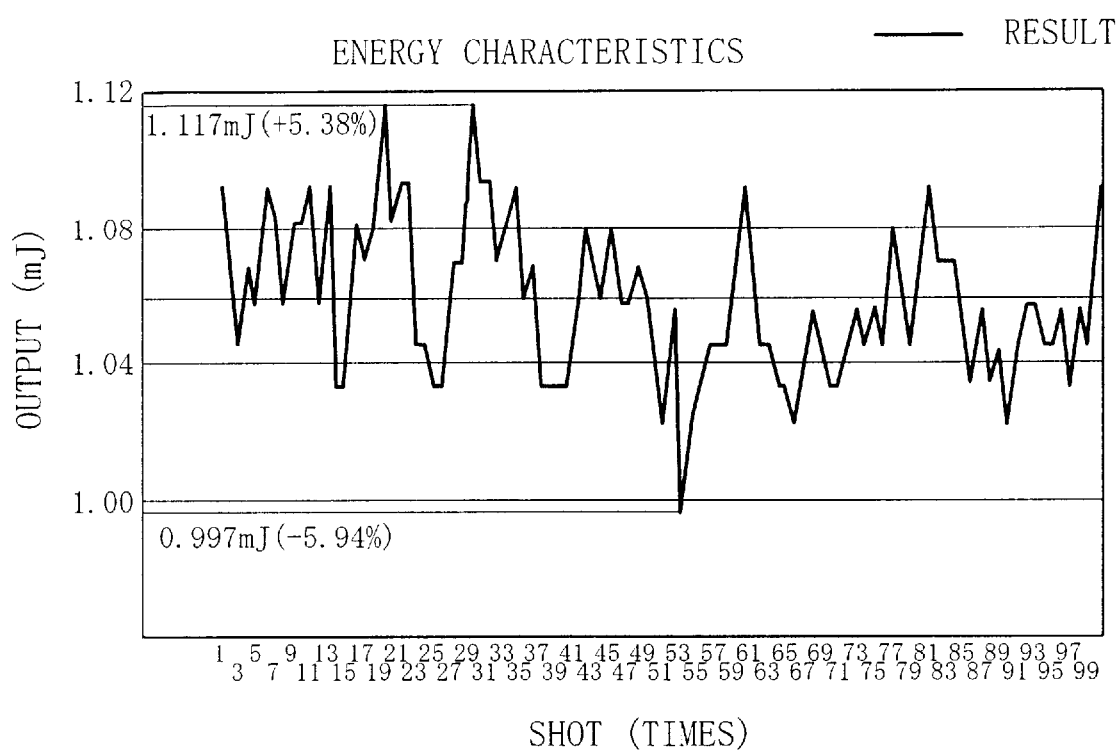
FIG. 4 is a diagram showing energy characteristics of a YAG laser.

Note that the lower limit of the optimal laser power band is herein defined as the minimum laser power capable of cutting, and the upper limit thereof is defined as the minimum laser power causing degradation in display quality due to scattering. Moreover, as shown in FIG. 4, the output energy of laser light is not constant, but varies within a certain range. FIG. 4 is a diagram showing energy characteristics of a YAG laser. Thus, even if the laser light is passed through a filter for radiation under desired laser power conditions, the laser power varies similarly within a certain range. Accordingly, the optimal laser power band must have such a width that allows for such variation in laser power (i.e., a sufficiently large width). Thus, it is difficult to cut a conventional multi-layer (two-layer or more) wiring whose optimal laser power band is limited to the overlapping region of the respective optimal laser power bands of the layers.

As described above, the signal line 3 of the present invention has the low-stacked regions 3'. Therefore, by radiating the laser light to these regions, the signal line 3 can be reliably and efficiently cut without causing the aforementioned problems. For example, YAG laser light (oscillation wavelength: 1,064 nm; output energy: 4 mJ/pulse or more) can be preferably used as laser light for cutting, because of its small installation area, low cost and easy maintenance.

Figure 5:
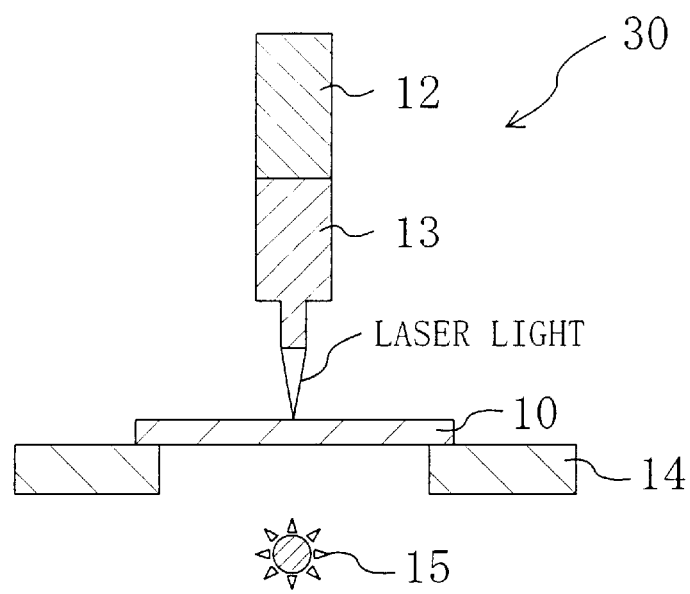
FIG. 5 is a schematic diagram showing a laser repairing apparatus 30 used in a defect repairing method of an embodiment of the present invention.

A laser repairing apparatus 30 used in the defect repairing method of the present embodiment is schematically shown in FIG. 5. This apparatus 30 has a YAG laser unit 12, an optical microscope 13, a panel set stage 14, and a light source 15. In order to cut a wiring, laser light oscillated from the YAG laser unit 12 is radiated through the optical microscope 13 onto the liquid crystal panel 10 on the panel set stage 14 while checking a defective portion of the liquid crystal panel 10 through the optical microscope 13 using the light from the light source 15 under the panel set stage 14.

Referring back to FIG. 2, in order to stabilize cutting accuracy, the low-stacked region 3' of the first conductive layer 3a preferably has a width W3' of about 5 $\mu$m to about 13 $\mu$m. A cutting width W7 by the laser light need only be equal to or smaller than the width W3' of the low-stacked region 3'. In the present embodiment, the width W3' is, for example, 8 $\mu$m, and the cutting width W7 by the laser light is the same as the width W3', i.e., 8 $\mu$m.

As described above, according to the present invention, the multi-layer wiring has low-stacked regions. Therefore, the multi-layer wiring can be reliably and efficiently cut by radiating the laser light to the regions. In other words, the cutting accuracy as well as the width of the laser power band can be significantly improved. Accordingly, the success rate and reliability in eliminating short-circuit are significantly improved, as well as the cutting efficiency is improved.

Figure 6:
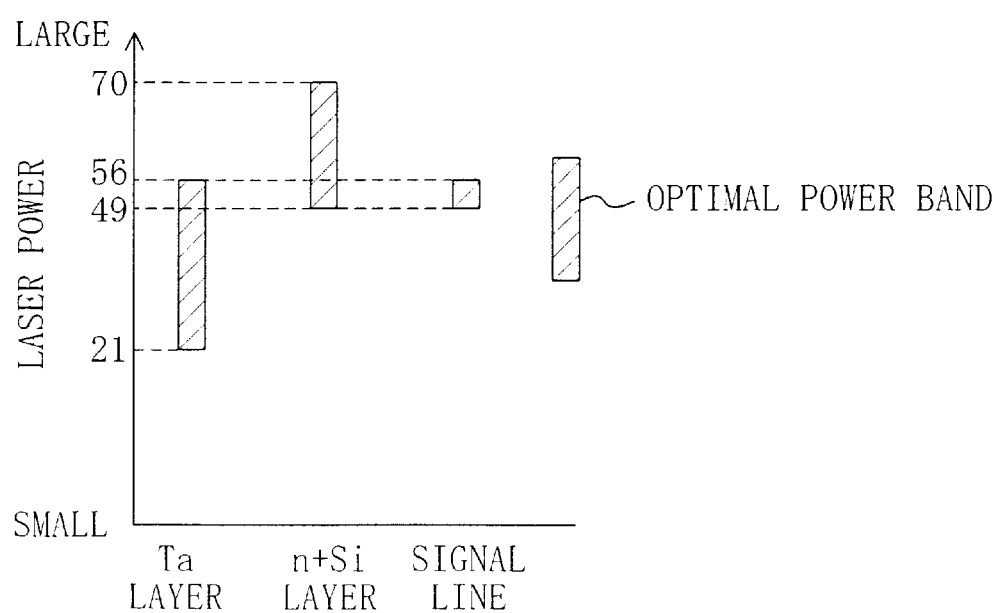
FIG. 6 is a diagram schematically showing a laser power band required to cut a two-layer wiring formed from a Ta layer and an $n^+Si$ layer.

The effects of the present invention are remarkable in a multi-layer wiring having a narrow overlapping region of the optimal laser power bands for cutting the respective layers. For example, in the case of a conventional two-layer wiring formed from an n$^+$Si layer and a Ta layer that are stacked on each other, the optimal laser power band of the Ta layer ranges from about 21 $\mu$J to about 56 $\mu$J, and the optimal laser power band of the n$^+$Si layer ranges from about 49 $\mu$J to about 70 $\mu$J, as shown in FIG. 6. Thus, the optimal laser power band for simultaneously cutting the Ta layer and the n$^+$Si layer ranges from about 49 $\mu$J to about 56 $\mu$J. In this case, the power of laser light to be radiated is actually set to 56 $\mu$J in view of a margin of insufficient cutting. As shown in FIG. 4, however, when the YAG laser output is set to, e.g., 1.06 mJ, the output energy actually varies within the range of 1.117 mJ to 0.997 mJ (+5.38% to −5.94%). Therefore, even if the laser light is passed through a filter for radiation with the laser power of 56 $\mu$J, the laser power actually varies within the range of 52.67 $\mu$J to 59.01 $\mu$J, resulting in unreliable repairing.

Figure 7A:
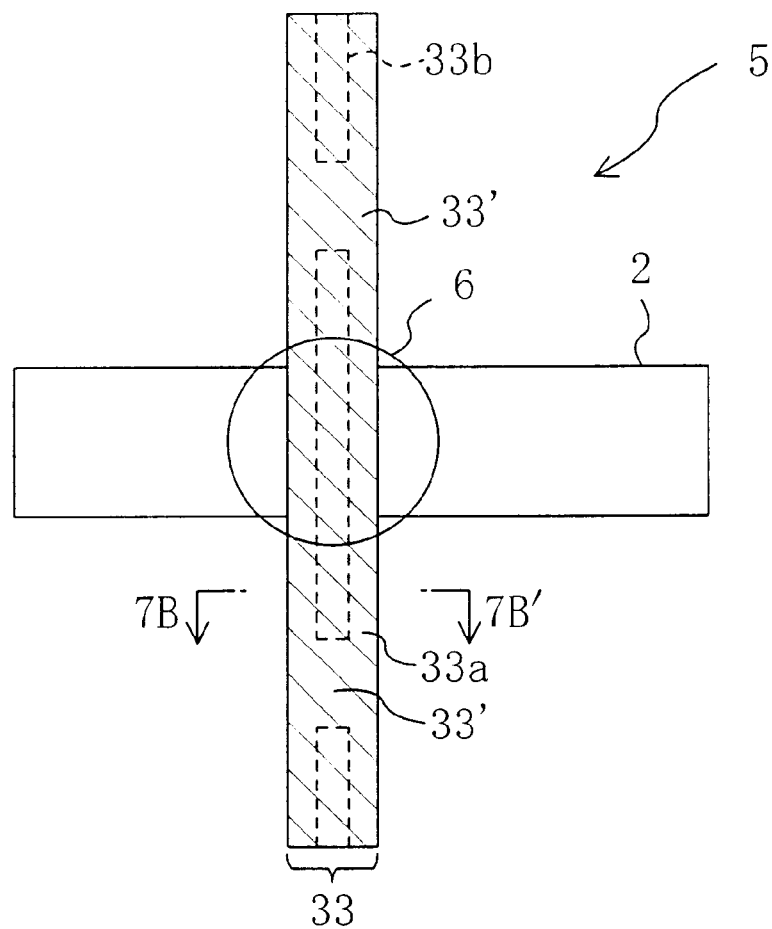
FIG. 7A is a top view schematically showing another signal line 33 in a TFT liquid crystal panel according to an embodiment of the present invention.
Figure 7B:
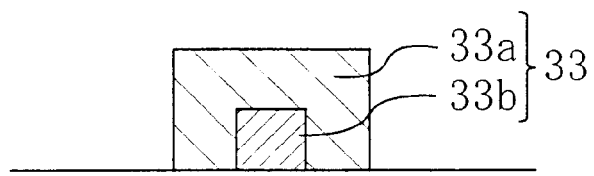
FIG. 7B is a cross-sectional view schematically showing another signal line 33 in a TFT liquid crystal panel according to an embodiment of the present invention.

In contrast, as shown in FIGS. 7A and 7B, a signal line 33 of the present invention having a second conductive layer 33b of n$^+$Si and a first conductive layer 33a of Ta formed thereon has low-stacked regions 33' where the second conductive layer (n$^+$Si layer) is omitted. Therefore, the optimal laser power band for cutting the low-stacked region corresponds to that for cutting the Ta layer (first conductive layer). This enables the optimal laser power band to have such a width that allows for variation in output energy of laser light and a margin of insufficient cutting (i.e., a sufficiently large width). Note that FIG. 7B shows a cross-sectional structure taken along line 7B–7B' of FIG. 7A.

The aforementioned signal line 33 is formed by, e.g., stacking the Ta layer stacked on the n$^+$Si layer formed in the same step as that of a semiconductor layer of the TFT. Such a structure suppresses generation of disconnection due to the difference in level (thickness of the scanning line) at the intersection of the scanning line and the signal line. It should be appreciated that generation of disconnection is also suppressed by a signal line having a three-layer structure of Ta layer (upper layer)/n$^+$Si layer (intermediate layer)/i-Si layer (lower layer), i.e., a signal line formed by stacking the Ta layer on the n$^+$Si layer/i-Si layer formed in the same step as that of the semiconductor layer of the TFT. In this case, it is preferable to form low-stacked regions where the n$^+$Si layer and the i-Si layer are omitted.

In the above embodiment, the present invention is applied to a signal line of two-layer structure. However, the present invention may also be applied to a scanning line of two-layer structure (e.g., Ta (upper layer)/TaN (lower layer)). Moreover, in the above embodiment, the upper second conductive layer 3b is omitted in the low-stacked region 3'. However, the present invention is not limited to this, and the omitted conductive layer may be located at any position in the multi-layer wiring. It should be appreciated that a conductive layer that is least likely to be cut with laser light is preferably omitted. Even in a multi-layer wiring of three layers or more, the effects of the present invention can be obtained by forming a low-stacked region where at least one layer is omitted.

In the case of using the structure (redundant structure) in which respective signals of the scanning line 2 and signal line 3 are input from both sides of the scanning line 2 and signal line 3, a display defect can be repaired even by cutting the scanning line 2 or signal line 3 at a position other than the interconnection thereof.

The present invention provides a display device having a multi-layer wiring structure and being capable of reliably and efficiently repairing defects, and a defect repairing method of the same. Thus, improved yield of the display device is achieved.

The present invention is not limited to the TFT LCD exemplified in the above embodiment, but can be generally applied to display devices having a multi-layer wiring structure.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A display device comprising a plurality of picture elements, a display state of each of the plurality of picture elements being controlled by an electric signal applied thereto through a corresponding switching element connected to a corresponding scanning line and a corresponding signal line crossing the scanning line, wherein at least one of the scanning line and the signal line is a multi-layer wiring including first and second conductive layers, the multi-layer wiring includes a low-stacked region where the second conductive layer is not formed, and the first conductive layer is formed from a material having a smaller specific resistance value than that of the second conductive layer.

2. The display device according to claim 1, wherein the at least one of the scanning line and the signal line, which is a multi-layer wiring, includes the low-stacked region on both sides of an intersection with the other line.

3. The display device according to claim 1, wherein a width of an optimal laser power band for cutting the first conductive layer is larger than that of an optimal laser power band for cutting the second conductive layer.

4. The display device according to claim 1, wherein the plurality of picture elements include a liquid crystal layer.

5. The display device according to claim 1,
wherein the second conductive layer is formed on the first conductive layer.

6. A method for repairing a defect in a display device including a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including first and second conductive layers, the multi-layer wiring has a low-stacked region where the second conductive layer is not formed, and the first conductive layer is formed from a material having a smaller specific resistance value than that of the second conductive layer, the method comprising the step of cutting the first conductive layer by selectively radiating laser light to the first conductive layer formed in the low-stacked region.

7. The method according to claim 6, wherein the at least one of the scanning line and the signal line, which is a multi-layer wiring, includes the low-stacked region on both sides of an intersection with the other line.

8. The method according to claim 6, wherein a width of an optimal laser power band for cutting the first conductive layer is larger than that of an optimal laser power band for cutting the second conductive layer.

9. The method according to claim 6, wherein the plurality of picture elements include a liquid crystal layer.

10. The method according to claim 6,
wherein the second conductive layer is formed on the first conductive layer.

11. A display device comprising a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including a first conductive layer and a second conductive layer formed on the first conductive layer, and the multi-layer wiring includes a low-stacked region where the second conductive layer is not formed.

12. A display device comprising a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including a first conductive layer and a second conductive layer formed on the first conductive layer, and the multi-layer wiring includes a low-stacked region wherein the second conductive layer is not formed on both sides of an intersection with the other line.

13. A method for repairing a defect in a display device including a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including first and second conductive layers, the multi-layer wiring has a low-stacked region where the second conductive layer is not formed, and a width of an optimal laser power band for cutting the first conductive layer is larger than that of an optimal laser power band for cutting the second conductive layer, the method comprising the step of cutting the first conductive layer by selectively radiating laser light to the first conductive layer formed in the low-stacked region.

14. The method according to claim 13,
wherein the second conductive layer is formed on the first conductive layer.

15. A method for repairing a defect in a display device including a plurality of picture elements, a display state of each of the plurality of picture elements being controlled by an electric signal applied thereto through a corresponding switching element connected to a corresponding scanning line and a corresponding signal line crossing the scanning line, wherein at least one of the scanning line and the signal line is a multi-layer wiring including a first conductive layer and a second conductive layer formed on the first conductive layer, and the multi-layer wiring has a low-stacked region where the second conductive layer is not formed, the method comprising the step of cutting the first conductive layer by selectively radiating laser light to the first conductive layer formed in the low-stacked region.

16. A method for repairing a defect in a display device including a plurality of picture elements, a display state of each of the plurality of picture elements being controlled by an electric signal supplied thereto through a corresponding switching element connected to a corresponding scanning line and a corresponding signal line crossing the scanning line, wherein at least one of the scanning line and the signal line is a multi-layer wiring including a first conductive layer and second conductive layer formed on the first conductive layer, and the multi-layer wiring has a low-stacked region where the second layer is not formed on both sides of an intersection with the other line, the method comprising the step of cutting the first conductive layer by selectively radiating laser light to the first conductive layer formed in the low-stacked region.

* * * * *